(12) United States Patent
Kim

(10) Patent No.: US 8,387,654 B2
(45) Date of Patent: Mar. 5, 2013

(54) AUTOMATIC PRESSURE REDUCING VALVE

(75) Inventor: Sang Wook Kim, Seoul (KR)

(73) Assignees: Sang Wook Kim, Seoul (KR); Sun Son, Seoul (KR)

( * ) Notice: Subject to any disclaimer, the term of this patent is extended or adjusted under 35 U.S.C. 154(b) by 259 days.

(21) Appl. No.: 12/742,777

(22) PCT Filed: Feb. 27, 2009

(86) PCT No.: PCT/KR2009/000940
§ 371 (c)(1),
(2), (4) Date: May 13, 2010

(87) PCT Pub. No.: WO2009/107999
PCT Pub. Date: Sep. 3, 2009

(65) Prior Publication Data
US 2010/0307612 A1    Dec. 9, 2010

(30) Foreign Application Priority Data

Feb. 28, 2008  (KR) .................. 10-2008-0018402

(51) Int. Cl.
*F16K 31/122*    (2006.01)
(52) U.S. Cl. .................. 137/494; 137/118.06; 137/554; 137/599.09; 137/601.2
(58) Field of Classification Search .................. 137/496, 137/494, 554, 599, 599.09, 601.2, 118.02, 137/118.06, 115.14
See application file for complete search history.

(56) References Cited

U.S. PATENT DOCUMENTS

| | | | | |
|---|---|---|---|---|
| 869,731 | A | * | 10/1907 | Richardson .................. 137/509 |
| 1,707,912 | A | * | 4/1929 | Heindorf ...................... 137/496 |
| 2,509,085 | A | * | 5/1950 | Dyke ............................ 137/494 |
| 3,294,105 | A | * | 12/1966 | Schaub ......................... 137/110 |
| 4,176,680 | A | * | 12/1979 | de Launay .................... 137/496 |
| 4,192,337 | A | * | 3/1980 | Alderson et al. .............. 137/101 |
| 4,718,450 | A | * | 1/1988 | Ezekoye ...................... 137/494 |
| 5,172,716 | A | * | 12/1992 | Paptzun .................. 137/115.05 |
| 7,048,000 | B2 | | 5/2006 | Koelzer |

FOREIGN PATENT DOCUMENTS

| | | |
|---|---|---|
| JP | 4-165509 | 6/1992 |
| JP | 9-160656 | 6/1997 |
| JP | 2005-316956 | 11/2005 |
| WO | WO2009/107999 A3 | 9/2009 |

* cited by examiner

*Primary Examiner* — John Rivell
*Assistant Examiner* — Time Aigbe
(74) *Attorney, Agent, or Firm* — Rosenberg, Klein & Lee

(57) ABSTRACT

Disclosed is an automatic pressure reducing valve. A body includes a hollow portion, an inlet portion and an outlet portion for flow of a fluid and has an internal space. A cylinder is installed inside the hollow portion and has at least two holes formed in its wall. An piston is movable along the inner side of the cylinder and adjusts opening rate of the holes according to a fluid pressure difference between an inlet portion and an outlet portion.

10 Claims, 4 Drawing Sheets

AUTOMATIC PRESSURE REDUCING VALVE

TECHNICAL FIELD

The present invention relates to a pressure reducing valve, and more particularly, to an automatic pressure reducing valve which is installed in a fluid transportation pipe, reduces pressure of a fluid flowing into an inlet through the transportation pipe and allows the fluid with reduced pressure to flow out of an outlet.

BACKGROUND ART

A pressure reducing valve is an apparatus which performs a function for reducing pressure of a fluid in the process of transporting a fluid through a pipe. A conventional pressure reducing valve has a passage way which is formed between an orifice, which is formed in a valve body for fluid passing, and a disk, of which a side faces to the orifice, disposed in a valve body, and adjusts opening rate of the passage way by controlling distance between the orifice and the disk, whereby pressure reducing function as well as adjustment of flow rate can be provided.

FIG. 1 is a longitudinally sectional view illustrating a conventional pressure reducing valve. A disk 12 moves by driving force generated by elastic force of a spring 16 which is coupled with the disk 12 through a driving shaft 14. The elastic force of the spring 10 is adjusted by a diaphragm 18 which is deformed by a pressure difference between an inlet side and an outlet side of an orifice for fluid flow. That is, the spring 16 serves as a direct power source of an operation for providing a pressure reducing function in the pressure reducing valve 10, and the diaphragm 18 serves to provide a function for adjusting opening rate of the passage way between the orifice and the disk.

However, when the conventional pressure reducing valve 10 is used for a long time, foreign materials mostly contained in a fluid can be accumulated in a space which accommodates the diaphragm 18. In this case, deformation of the diaphragm 18 cannot be properly induced, whereby the pressure reducing accuracy is deteriorated.

Also, it is important that the conventional automatic reducing valve must be able to always give a normal performance with which a reduced pressure can be still maintained at a pre-established level even in case that no fluid flows out of an outlet and thus the orifice is completely closed by the disk However, even though the orifice retains a completely closed state, a minute quantity of fluid leaking toward to an outlet through a minute crack to be formed at the passage way between the orifice and the disk causes a pressure in an outlet to gradually exceed the pre-established pressure and be finally equal to an inlet pressure. The minute crack can be formed due to a limited spring force to be applied to disk and/or a foreign materials settled on the surface of the disk which faces the orifice.

And particularly, in a fixed size of automatic pressure reducing valve no matter how largely an opening of the passage way between the orifice and the disk is opened, flow rate of a fluid to be passable through the orifice is limited at a constant pressure difference between the inlet and the outlet since an automatic pressure reducing valve with a fixed size has a fixed size of orifice in itself.

And also, the conventional pressure reducing valve 10 usually has not a structure with which an element functioning to detect an occurrence of flow is integrated.

DISCLOSURE OF INVENTION

Technical Problem

It is an object of the present invention to provide an automatic pressure reducing valve in which a fluid with a pressure flows into an inlet and then flows out of an outlet with a pressure reduced according to a properly pre-established ratio of the inlet pressure to outlet pressure.

Technical Solution

The present invention provides an automatic pressure reducing valve, comprising: a body which includes a hollow portion, an inlet portion and an outlet portion, wherein the inlet and the outlet portions are respectively coupled with the hollow portion and a fluid in the inlet portion flows into the hollow portion and flows out of the outlet portion with a reduced pressure; a cylinder which includes a first portion which has at least one hole to allow a fluid in the inlet portion of the body to pass into the hollow portion of the body and a second portion which has an inside diameter larger than an inside diameter of the first portion of the body, and which has a T shape of longitudinal section in which each end of the first and the second portions is opened, wherein a lower end of the first portion is connected to an under wall of the hollow portion of the body or an upper side of the inlet portion of the body, an upper end of the second portion is apart from the outlet portion of the body and each outer side of the first and the second portions are apart from a wall of the hollow portion of the body; and a piston which is inserted into an inner space of the cylinder, moves along an inner side of the cylinder in a direction parallel to a central axis of the cylinder, adjusts opening rate of the holes of the first portion of the cylinder, has a third portion with an outside diameter smaller than the inside diameter of the first portion of the cylinder and a fourth portion with an outside diameter smaller than the inside diameter of the second portion of the cylinder and has a T shape of longitudinal section in which either or both of the section ends is blocked.

The ratio of a fluid pressure in the hollow portion of the body to a fluid pressure in the inlet portion of the body depends on a square of a ratio of the outside diameter of the first portion of the piston to the outside diameter of the second portion of the piston.

The automatic pressure reducing valve further comprises two sealing members, which seal a gap between the cylinder and the piston, of which one sealing member is disposed between a partial portion over the hole of the first portion and the third portion of the piston and the other sealing member is disposed between the second portion of the cylinder and the fourth portion of the piston.

The automatic pressure reducing valve further comprises a third sealing member which is disposed between an upper side of the inlet portion or an inner side of the under wall of the hollow portion and a brim side of a lower end of the piston to prevent a fluid in the inlet portion of the body from leaking toward the hole of the first portion through a crack to be formed between the brim side and the upper side in case that the upper side of the inlet portion and the brim side of the lower end of the piston are in contact with each other.

The automatic pressure reducing valve further comprises one or more stoppers which are coupled with the piston and restrict movement of the piston within a predetermined distance.

A pipe or tube shape of ventilation member through which a gap sealed by the two sealing members disposed between the cylinder and the piston communicates with atmosphere outside the body, wherein one end of the pipe or the tube is connected to a wall of the cylinder inside which a sealed gap exists and the other end to a wall of the hollow or the outlet portion of the body.

The automatic pressure reducing valve further comprises a drain pipe, of which one end is connected to a lower sidewall or an under wall of the hollow portion and the other end is opened, to discharge a fluid in the hollow portion or in the hollow portion and a pipe which is connected to the outlet portion outside the body by opening of a flow control valve to be normally closed.

The automatic pressure reducing valve further comprises a first automatic relief valve which is installed in a by-pass pipe for a use of a first relief pipe of which one end is connected to a drain pipe between the hollow portion and a flow control valve in the drain pipe and the other end to a drain pipe between the flow control valve and the end of the drain pipe or which is installed in a first relief pipe of which one end is directly connected to a wall of the hollow or the outlet portion of the body and the other end is opened or connected to a drain pipe between the flow control valve and the end of the drain pipe.

An automatic pressure reducing valve further comprises a second automatic relief valve which is installed in a second relief pipe of which one end is connected to a wall of the inlet portion and the other end is opened or connected to a drain pipe between the flow control valve and the end of the drain pipe.

The automatic pressure reducing valve further comprises and electrically switching member which is attached to an outside of a wall of the hollow portion or the outlet portion and operated with ON and OFF by a structure, which is coupled with the piston and movable together with movement of the piston, and which detects an occurrence of flow of fluid.

Advantageous Effects

According to the present invention, in a fluid piping system to transport, distribute and discharge a fluid, a useful range of discharge pressure can be applied to one or more discharging devices installed in the fluid distribution pipe by means of pressure reducing function of the present invention. In case of a sprinkler fire extinguishing system, a water-flow detecting function can be employed in addition to the pressure reducing function of the present invention.

Also, according to the present invention, even though flowing of fluid out of discharging device is continuously stopped, a pressure difference between fluids in an inlet and an outlet of the present invention can be held. Such a performance can be accomplished due to the higher sealing effect to be appeared according to the higher pressure beyond a pre-established reduced pressure in the present invention.

Since a water pressure in a water piping system which supplies and distributes water to every floor of a multi-story building is higher at the lower floor owing to gravity force, two or more vertical water supply and distribution zones, of which every zone includes the number of floors and one or more booster pumps and water reservoirs are provided to supply water to the zone, can be provided in a high-rise building, particularly in a skyscraper, however, due to a reliable performance to prevent pressure equalization between the water supply and distribution pipe even in case that flowing of fluid is continuously stopped, the present invention can allow all floors in the building to be a single zone to supplied by one or more pumps and water reservoirs as long as pumps with high discharge pressure proper to the water supply and distribution system can be provided.

DESCRIPTION OF MAJOR SYMBOL IN THE ABOVE FIGURES

Figure 1:
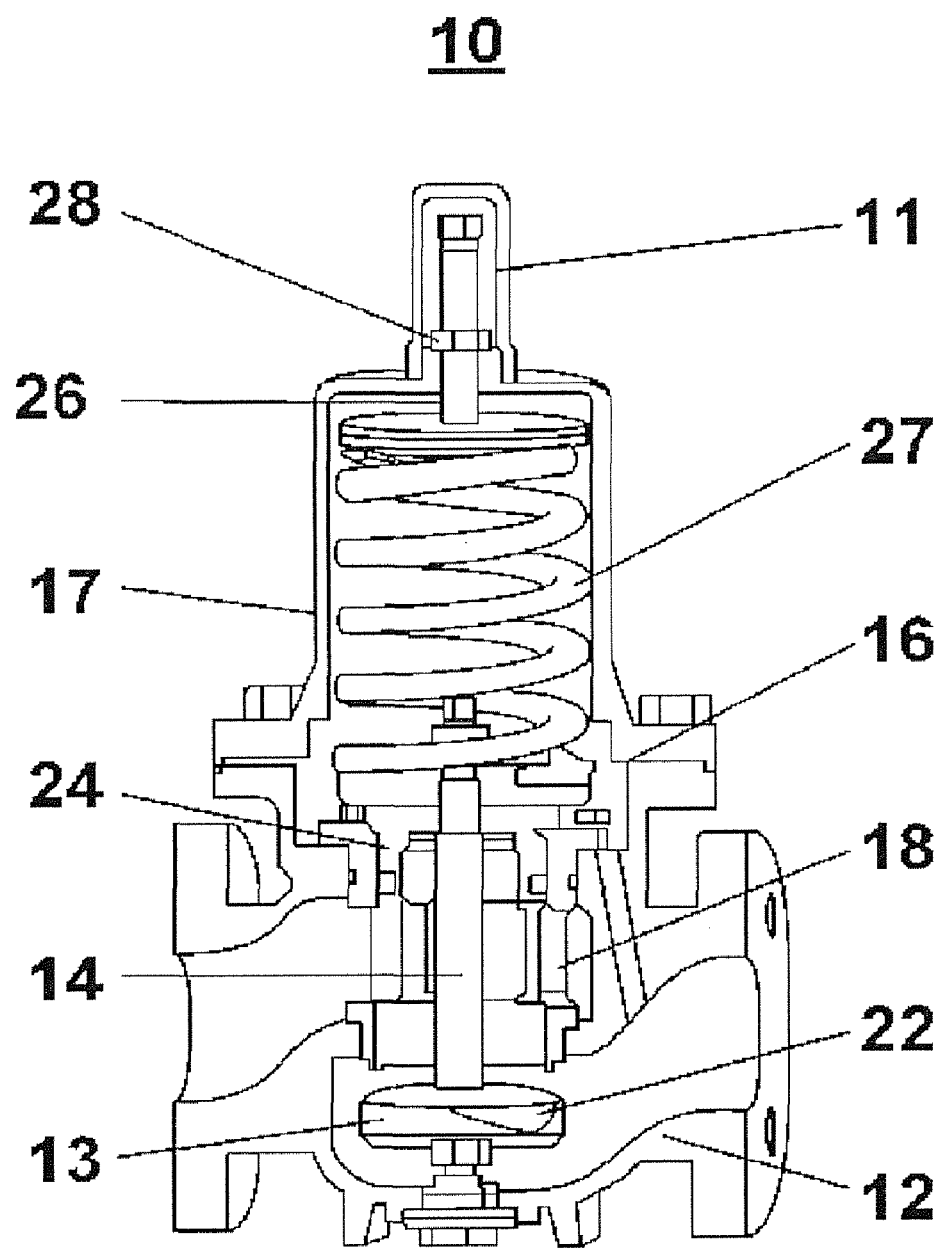
FIG. 1 is a longitudinally sectional view illustrating a conventional pressure reducing valve.

100: Automatic pressure reducing valve
110: Body 111: Hollow portion
112: Inlet portion 114: Outlet portion
118: Drain pipe 119: Flow control valve
120: Cylinder 120$a$: First portion
120$b$: Second portion 120$c$: Fifth portion
122: Holes 130: Piston
130$a$: Third portion 130$b$: Fourth portion
152: Ventilation member 160: Stopper
172: First relief pipe 174: First automatic relief valve
182: First pressure gauge 184: Second pressure gauge
185: Second relief pipe 186: Second automatic relief valve

BEST MODE FOR CARRYING OUT THE INVENTION

Hereinafter, an automatic pressure reducing valve according to exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. In the drawings, the size and relative sizes of layers and regions may be exaggerated for clarity. Also, when an element is referred to as being "on", or "below", another element, it can be directly on or directly below the other element or layer, or intervening elements may be present. Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Figure 2:
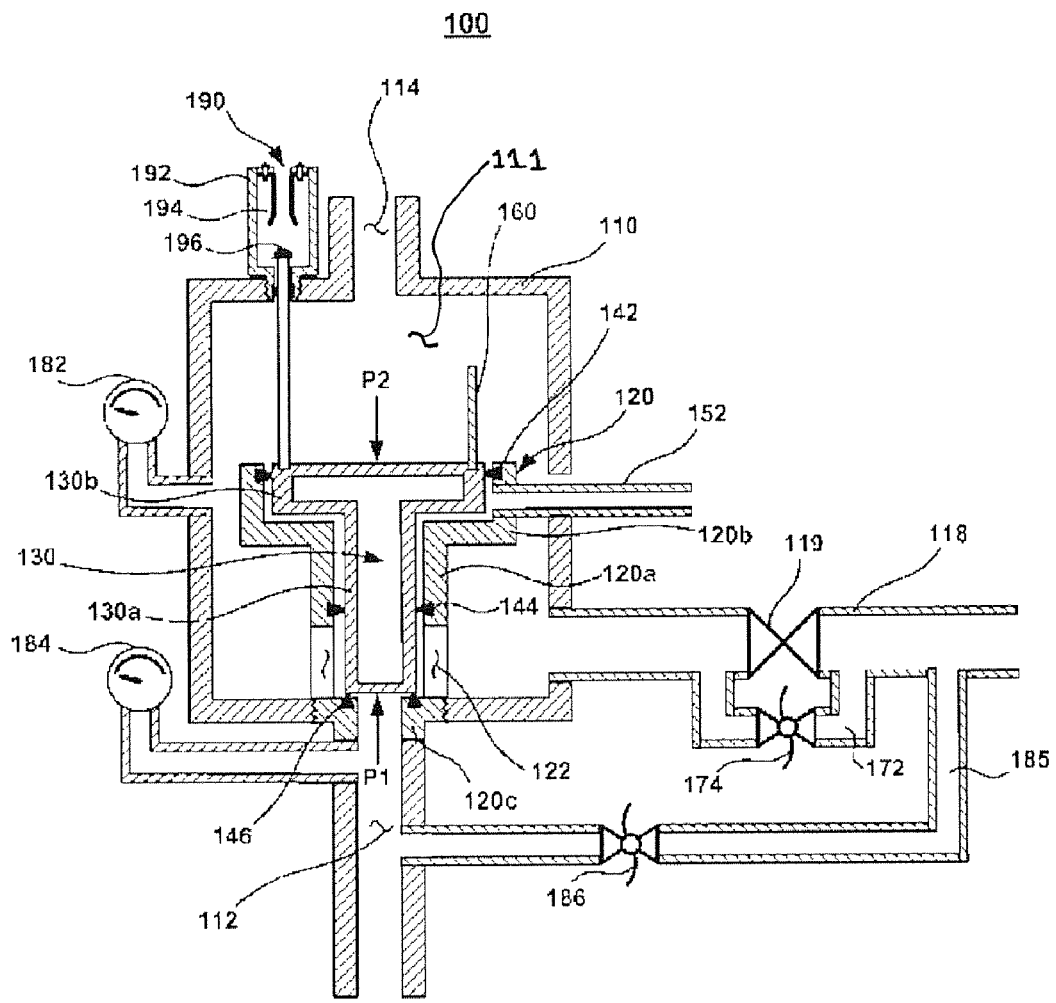
FIG. 2 is a schematic diagram illustrating a configuration of an automatic pressure reducing valve according to an exemplary embodiment of the present invention.
Figure 3:
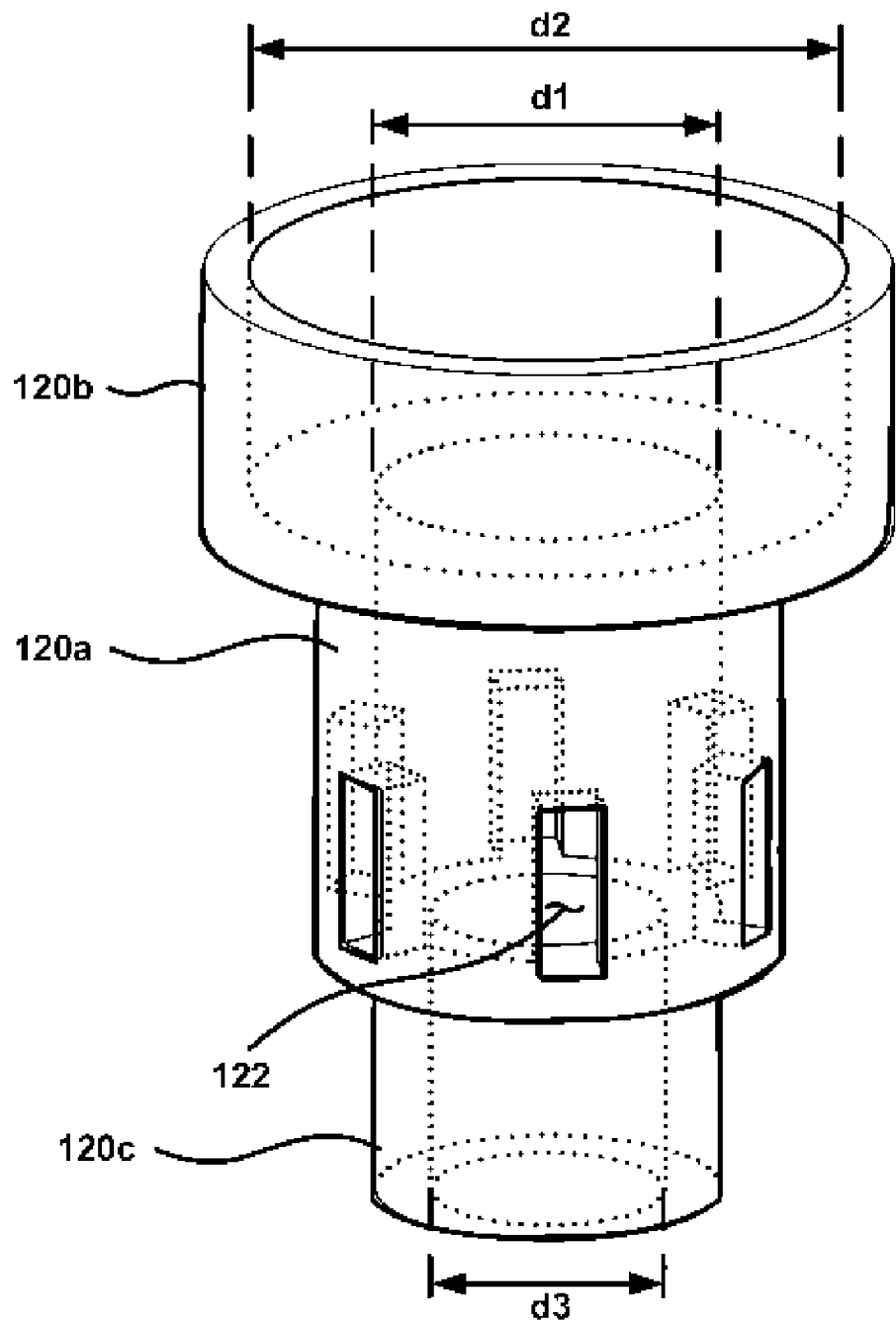
FIG. 3 is a perspective view illustrating a cylinder shown in FIG. 2.
Figure 4:
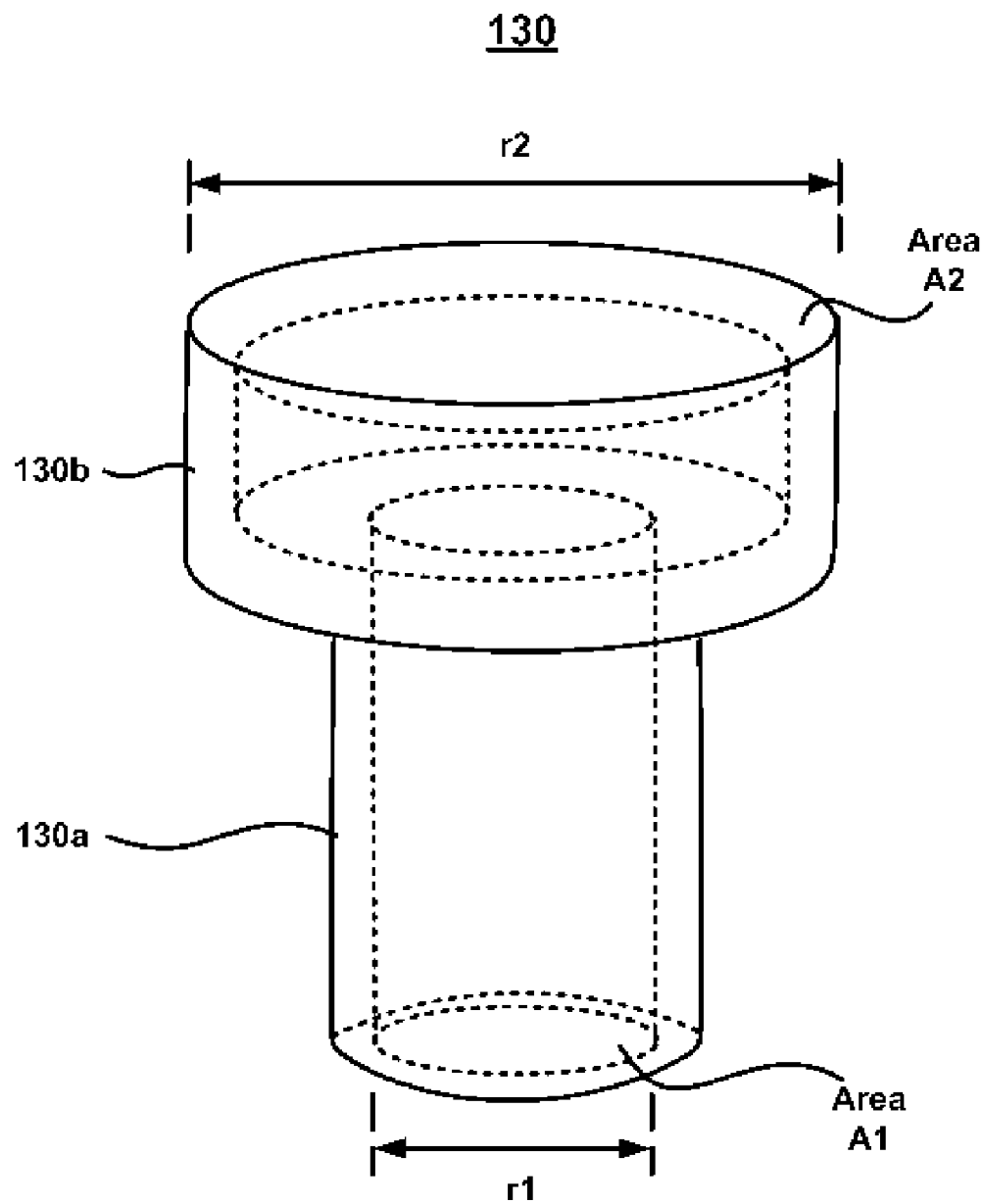
FIG. 4 is a perspective view illustrating an piston shown in FIG. 2.

FIG. 2 is a schematic diagram illustrating a configuration of an automatic pressure reducing valve according to a first exemplary embodiment of the present invention, FIG. 3 is a perspective view illustrating a cylinder shown in FIG. 2, and FIG. 4 is a perspective view illustrating an piston shown in FIG. 2.

Referring to FIG. 2, an automatic pressure reducing valve 100 includes a body 110 which includes a hollow portion 111, an inlet portion 112 and an outlet portion 114 for fluid flow, a cylinder 120 which is so installed inside the hollow portion 111 as to communicate with the inlet portion 112 and has at least one hole 122 in the wall of the first portion 120$a$, and a piston 130, which is movable in a direction parallel to a central axis of the cylinder with a sliding motion along the inner side of the cylinder 120 according to a variation of pressure difference between the inlet portion 112 and the outlet portion 114 or the hollow portion 111 and thereby adjusts opening rate of the hole 122. The pressure reducing valve 100 allows a fluid flowing from the inlet portion 112 to the outlet portion 114 to have a pressure reduced by interaction between the cylinder 120 and the piston 130 in the course to pass through the hole 122.

The body 110 is installed between a fluid supply and a fluid distribution pipe through which a fluid with reduced pressure flows. The inlet portion 112 and the outlet portion 114 are coupled with the lower and the upper walls of the hollow portion 111, respectively, wherein the fluid entrance of the inlet portion 112 is connected to a fluid supply pipe and the fluid exit of the outlet portion 114 to a fluid distribution pipe, respectively.

Referring to FIGS. 2 and 3, the cylinder 120 has a cylindrical shape in which its both ends are opened and is such disposed inside the hollow portion 111 that the lower end is connected to the under wall of the hollow portion 111 or the upper side of the inlet portion 112 and the central axis of the cylinder 120 meets with the central point of the upper end of the inlet portion 112, wherein the upper end of cylinder 120 is apart from the outlet portion 114 and the wall of the cylinder 120 from the inner side of the hollow portion 111.

The cylinder 120 includes a first portion 120a with a first inside diameter and a second portion 120b with a second inside diameter. The second inside diameter is larger than the first inside diameter. Therefore, the cylinder has a longitudinal section similar to a shape of a thick letter T. At least one hole 122 is formed in the wall of the first portion 112 to serve to allow a fluid, which flows from the inlet portion 112 to the outlet portion 114, to pass through them. Preferably, the hole 122 is disposed at a location adjacent to the inlet portion 112.

Referring to FIGS. 2 and 4, the piston 130 has a letter T shape of longitudinal section similar to the cylinder 120 in which either or both ends are blocked. The FIGS. 2 and 4 show the both ends are blocked. The piston 130 has a third portion 130a with an outside diameter minutely smaller than the inside diameter of the first portion 120a and the fourth portion 130b with an outside diameter also minutely smaller than the inside diameter of the second portion 120b. Therefore, the piston can be inserted into an inner space of the cylinder 120 and is movable up and down with a sliding motion along the inside of the cylinder 120, wherein the central axises of the cylinder and the piston accord each other. Consequently, when the end of the piston arrives at a location lower than the lower end of the hole 122, the hole 122 is closed, and if the end of the piston 130 moves up away the location of the lower end of the hole 122, the hole 122 begins to open and thus the opening rate of the hole 122 increases according to a moving-up of the piston 130. Thus, the piston can have a function to adjust the opening rate of the hole 122.

An area of the third portion 130a to be applied by fluid pressure (hereinafter, "first pressure", symbolized "$P_1$") in the inlet portion 112 in a direction parallel to the central axis of the piston 130 is same as a cross-sectional area (hereinafter, "first area, symbolized "$A_1$") of the third portion 130a and, likewise, an area of fourth portion 130b to be applied by fluid pressure (hereinafter, "second pressure", symbolized "$P_2$") in the hollow portion 111 is same as a cross-sectional area (hereinafter, "second area", symbolized "$A_2$") of the fourth portion 130b, whatever the geometry of the first area as well as the second area is. Therefore, even if either or both ends of the piston 130 are blocked, the first and the second areas to be applied by fluid pressure are not changed, respectively.

And a driving force (hereinafter, symbolized "$F_1$" and "$F_2$") which allows the piston 130 to move upward or downward is equal to $P_1A_1$ or $P_2A_2$, respectively, that is, the equations $F_1=P_1A_1$ and $F_2=P_2A_2$ are given. Those are natural in a viewpoint of the principle as known in the field of fluid dynamics.

If $F_1$ equals $F_2$, the piston will move neither upward nor downward, that is, an equilibrium state will be achieved between the forces $F_1$ and $F_2$. Accordingly, whenever the two forces are not same each other, equilibrium state disappears and the piston will thus move.

Here, it can be easily understood that the piston 130 has a characteristics of tendency to move to such a direction that an equilibrium state of $F_1=F_2$, that is, the state of $P_1A_1=P_2A_2$ can be achieved. In the equilibrium state, the second pressure can hold a reduced pressure $P_2$ obtained by a first pressure $P_1$ times a first area $A_1$ to a second area $A_2$ as understood by the above equation $P_1A_1=P_2A_2$. For example, in an automatic pressure reducing valve 100 of the present invention in which a pressure $P_1$, a first area $A_1$ and a second area $A_2$ are fixed, if flow rate of a fluid to flow out of the outlet portion 144 begins to vary whether increases or decreases, the second pressure $P_2$ will also begin to vary decreasingly or increasingly by the first pressure $P_1$ times the first area $A_1$ to the second area $A_2$ and then the piston 130 will move upward or downward so that the equilibrium state of $F_1=F_2$ can be achieved again, thereby causing the movement of the piston 130 to adjust opening rate of the hole 122 and to allow flow rate through the hole 122 to be matched to the varying flow rate out of the outlet portion 114. Consequently, the second pressure $P_2$ can be still retained even in the course of the piston movement.

Therefore, pressure reducing function of the present invention can be understood by the operation principle of the piston 130 as described above.

Meanwhile, a minute gap is formed between the cylinder 120 and the piston 130. Here, two sealing members are disposed to seal the gap (hereinafter, "sealed gap") in two positions apart from each other, respectively.

For example, first and second members 142 and 144 are disposed between a partial portion over the hole 122 of the first portion 120a and the third portion 130a and between the second portion 120b and the fourth portion 130b, respectively. And then the sealed gap can be obtained between the cylinder 120 and the piston 130. Without such a sealed gap, the first area $A_1$ to be applied by pressure in the inlet portion 112 and the second area $A_2$ to be applied by pressure in the hollow portion 111 become hydraulically same since fluid always fills the unsealed gap (hereinafter, "unsealed gap") between the cylinder 120 and the piston 130. Consequently, a pressure reducing function of the piston 130 can be substantially lost.

The first and second sealing members 142 and 144 serve not only to prevent a fluid from filling the unsealed gap as mentioned above but also to prevent the piston 130 from minutely shaking.

The first and second sealing members 142 and 144 can be disposed such that a sealing member with a property of elasticity and lubrication is inserted into a groove (not shown) formed in an inner side of the cylinder 120. Alternatively, the first and second sealing members 142 and 144 can be also disposed in a groove formed in the outer side of the piston 130.

Also, a third sealing member 146 can be disposed between an upper side of the inlet portion 112 or an inner side of the under wall of the hollow portion and a brim side of the lower end of the piston 130, wherein the upper side of the inlet portion 112 can contact with the brim side if the piston continuously moves downward.

The third sealing member 146 thus serves to prevent a fluid from leaking toward to the hole 122 through a minute crack to be probably formed, even though the piston 130 closes the hole 122, between the upper side of the inlet portion 112 and the brim side of the lower end of the piston 130 when the two sides are in contact with each other, and thus to prevent a pressure reducing effect from gradually disappearing in spite of closing of the hole 122 by the piston 130 since increase of a small amount of fluid leaked into the hollow portion 111 causes a force pressing the third sealing member to get more stronger and thus to enhance the sealing effect more satisfactorily. Without the third sealing member, an pressure reducing effect can not substantially appear since the fluid leaked through the crack as mentioned above continuously enters the hollow portion 111.

And also, preferably, the third sealing member 146 can be disposed in a groove formed in the upper side of the inlet portion 112 or the brim side of the piston 130 in a similar method to the first and the second sealing members 142 and 144.

A ventilation member 152 of a pipe or tube shape can be further disposed between the sealed gap and the outside of the body 110 so that atmosphere, which has a gage pressure of zero, can communicate with the sealed gap.

As described above, thanks to the first to third sealing members 142, 144 and 146 and the ventilation member 152, the pressure reducing function of the automatic pressure reducing valve 100 according to the present invention can be more reliably provided.

One or more stoppers 160 which are coupled with the piston 130 and physically restricts movement of the piston 130 within a limited distance can be further disposed. The restriction within a limited distance can be achieved between the piston 130 and an upper wall of the hollow portion 111 or the outlet portion 114, and also, between the cylinder 120 and the piston 114. For example, between the piston 130 and the hollow portion 111, the stopper 160 can be so disposed that its one end faces the upper wall of the hollow portion 111 with a predetermined distance and the other end is coupled with an upper end of the piston 130. Thus, a predetermined distance between an upper end of the stopper 160 and the upper wall of the hollow portion 111 can become a maximum distance of the piston movement, which is, preferably, more than the distance that the stopper 160 allows the piston 130 to move until the piston 130 completely opens the hole 122.

And also, the stopper can not only restrict movement of the piston 130 within a limited distance but enable an automatic reducing valve of the present invention to be installed even in a pipe with any direction of flow.

A first automatic relief valve 174 is installed in a by-pass pipe for a use of a first relief pipe 172 of which one end is connected to a drain pipe 118 between the hollow portion 111 and a flow control valve 119 in the drain pipe and the other end to a drain pipe between the flow control valve 119 and the end of the drain pipe 118 or which is installed in a first relief pipe 172 (not shown) of which one end is directly connected to a wall of the hollow portion 111 or the outlet portion 114 of the body 110 and the other end is opened or connected to a drain pipe 118 between the flow control valve 119 and the end of the drain pipe 118 to relieve an overpressure of a fluid in the hollow portion 111 which exceeds a set pressure to be manually adjusted.

If an abnormal rise of the first pressure momentarily occurs due to a physical phenomenon like a water hammer or surging and the abnormally high pressure is applied to a lower end of the piston 130 during a short time, the piston can once move up and the movement of the piston 130 thus causes a little amount of fluid in the inlet portion 112 to enter the hollow portion 111 and raise a second pressure beyond the pressure in normally reduced level. In such a situation, the automatic relief valve 174 can operate at a set pressure to be manually adjusted and can relieve an unexpected rise of the second pressure by discharging water outside of the body.

However, the present invention can have a reliable capability to allow the second pressure to be maintained in a proper range of pressure necessary to discharge of water without an automatic pressure relief valve in spite of an ordinary water hammer to be possible in most piping systems to supply water, so long as a too much high pressure to be unexpected is not produced in the inlet portion 112 due to an abnormally severe water hammer to be hardly occurred in the ordinary piping systems. It is due to the reason described hereunder.

A temporary slight movement of the piston which can be occurred even by a force of ordinary water hammer generated in the inlet portion 112, may cause a small amount of water in the inlet portion 112 to enter the hollow portion 111 and thereby to raise the second pressure more or less, however, the second pressure can not rise continuously beyond a limitation of pressure since the force pressing the third sealing member is also getting stronger so much in the proportion of $A_2$ to $A_1$ and, accordingly, the sealing effect is getting much higher. Consequently, the second pressure can hardly rise to the extent that the automatic relief valve 174 is needed so long as a too much high pressure is not produced due to an unexpected severe water hammer. Therefore, the automatic pressure reducing valve of the present invention can also contribute to protect the water distribution piping system connected to the outlet portion 114 from a bad influence by an ordinary water hammer.

In an ordinary water supply and distribution piping system, water hammer can usually occur when a water supply pump begins to operate, the pump in operation stops its operation or a steady flow is rapidly blocked by operation of flow control valve (not shown) like a gate valve whether hydraulic power of water hammer is ordinary or severe. In this case, most noticeable water hammer can usually occur in a supply pipe with one or more control valves (not shown) between an automatic pressure reducing valve 100 of the present invention and the water supply pump. Therefore, to install a second automatic relief valve 186 in a second relief pipe, of which one end is connected to a wall of the inlet portion 112 and the other end is opened or connected to a drain pipe 118 between a control valve 119 and an opened end, and enable the second automatic relief valve 186 to operate at a predetermined set pressure to be manually adjusted can become a useful means which makes a resistance function of the automatic reducing valve 100 of the present invention against a power of water hammer even without the first automatic relief valve 174 to cooperate with overpressure relief function of the second automatic relief valve 186.

Referring to FIGS. 2 and 4, the drain pipe 118 can be connected to the automatic pressure reducing valve 100 of the present invention to drain water in the hollow portion 111 and a distribution pipe connected to the outlet portion 114 for care and maintenance or to drain water in the hollow portion 111 for periodical test the pressure reducing function of the present invention.

A flow control valve 119 to be normally closed is installed in the drain pipe since the water in the hollow portion 111 will be always and continuously drained out of the hollow portion without the flow control valve 119.

The automatic pressure reducing valve 100 can further comprise pressure gages 182 and 184, first pressure gage installed in the inlet portion 112 and the second gage in the outlet or the hollow portion, to check visually and periodically whether the second pressure is maintained by a pressure reduced in the proportion of the second area to the first area or not.

The fluid flowing through the fluid distribution pipe, the fluid discharge out of the discharging device and the opening of the hole 122 almost spontaneously occur, and therefore, a ready-made or newly-developed electrically switching member to be operated with ON and OFF by a structure which is movable together with movement of the piston 130 and is employed between the electrically switching member and the piston, can be attached to the outer side of the hollow portion 111 or the outlet portion 114 and allow an electrical system detecting an occurrence of fluid flow due to movement of the piston to be achieved.

Otherwise, a ready-made pressure switch, which is attached to a member (not shown) which has a small vacant inner space, into which a fluid in the hollow portion 111 can enter or not when the space is opened or closed by a structure to be movable together with movement of the piston 130, can also allow an electrical system detecting an occurrence of a fluid flow to be achieved. However, the present invention is not limited to such a configuration method of an electrically switching member.

The electrically switching member as described above, as not shown in figures, can functions as a flow detector and/or an actuator for automatic operation of pump and alarming and/or monitoring device or equipment, etc. Accordingly, for instance, in a sprinkler fire extinguishing system, the automatic pressure reducing valve in which functions of pressure reduction and flow detection are joined together can be provided without a separate installation of an automatic pressure reducing valve and a water-flow detecting valve to be usually called an alarm valve.

The automatic pressure reducing valve of the present invention can be usefully utilized in piping systems for supply and distribution of any kind of fluid in many industrial factories such as a petrochemical factory. In this case, components such as the body, the cylinder, the piston, and the sealing members are preferably made of a material which is not soluble in the fluid and also has not an ability of a chemical reaction to the fluid. Since a fundamental operation principle which is applied to reduce pressure of a fluid and adjust flow rate of the fluid can also be identically applied to an automatic pressure reducing valve of the present invention to be utilized in various industrial fields, there will be almost nothing the matter in utilizing the automatic pressure reducing valve of the present invention in the fields if its component materials variously so changed as to be proper to the fields are used.

While the example embodiments of the present invention and their advantages have been described in detail, it should be understood that various changes, substitutions and alterations may be made herein without departing from the scope of the invention.

The invention claimed is:

1. An automatic pressure reducing valve, comprising:
a body having a hollow portion, an inlet portion and an outlet portion, the inlet and the outlet portions are respectively disposed on opposing ends of the hollow portion and are in fluid communication each to the other, and fluid in the inlet portion flows into the hollow portion and flows out of the outlet portion with reduced pressure;
a cylinder including a first portion having at least one opening defining a hole for allowing passage of the fluid in the inlet portion of the body into the hollow portion of the body and a second portion having an inside diameter larger than an inside diameter of the first portion, and the cylinder having a T shaped profile with openly communicated ends of the first and the second portions, wherein a lower end of the first portion is connected to an under wall of the hollow portion of the body or an upper side of the inlet portion of the body, an upper end of the second portion is displaced from the outlet portion of the body and each outer side of the first and the second portion is displaced from a wall of the hollow portion of the body;
a piston having a T-shaped profile with opposing top end and lower end, the piston slidingly disposed within an inner space of the cylinder, the piston being displaceable responsive to pressure differential between the inlet portion and the outlet portion, whereby fluid from the inlet portion flows through the opening into the hollow portion and out of the outlet portion when the piston is displaced responsive to said pressure differential created by a first pressure acting on said first end and a second pressure acting on said top end, said piston having a third portion with an outside diameter smaller than the inside diameter of the first portion of the cylinder and a fourth portion with an outside diameter smaller than the inside diameter of the second portion of the cylinder.

2. The automatic pressure reducing valve of claim 1, wherein a ratio of a fluid pressure in the hollow portion of the body to a fluid pressure in the inlet portion of the body depends on a square of a ratio of an outside diameter of the third portion of the piston to an outside diameter of the fourth portion of the piston.

3. The automatic pressure reducing valve of claim 1, further comprising, two sealing members to seal a gap between the cylinder and the piston, one sealing member being disposed between a partial portion over the hole of the first portion and the third portion of the piston and the other sealing member being disposed between the second portion of the cylinder and the fourth portion of the piston.

4. The automatic pressure reducing valve of claim 1, further comprising, a third sealing member disposed between an upper side of the inlet portion or an inner side of the under wall of the hollow portion and a brim side of a lower end of the piston to prevent fluid in the inlet portion of the body from leaking into the hole of the cylinder.

5. The automatic pressure reducing valve of claim 1, further comprising, one or more stoppers which are coupled with the piston and restrict movement of the piston within a predetermined distance.

6. The automatic pressure reducing valve of claim 3, further comprising, a pipe or a tube shaped ventilation member through which the gap sealed by the two sealing members disposed between the cylinder and the piston communicates with atmosphere outside the body, wherein one end of the pipe or the tube is connected to a wall of the cylinder and the other end is connected to a wall of the hollow or the outlet portion of the body.

7. The automatic pressure reducing valve of claim 1, further comprising, a drain pipe having one end connected to a lower sidewall or an under wall of the hollow portion and the other end openly communicated to discharge a fluid in the hollow portion and a pipe connected to the outlet portion outside the body by opening of a flow control valve.

8. The automatic pressure reducing valve of claim 1, further comprising, a first automatic relief valve which is installed in a by-pass pipe for a use of a first relief pipe of which one end is connected to a drain pipe between the hollow portion and a flow control valve in the drain pipe and the other end to a drain pipe between the flow control valve and the end of the drain pipe of which is installed in a first relief pipe of which one end is directly connected to a wall of the hollow portion or the outlet portion of the body and the other end is opened or connected to a drain pipe between the flow control valve and the end of the drain pipe.

9. The automatic pressure reducing valve of claim 1, further comprising, a second automatic relief valve which is installed in a second relief pipe of which one end is connected to a wall of the inlet portion and the other end is opened or connected to a drain pipe between the flow control valve and the end of the drain pipe.

10. The automatic pressure reducing valve of claim 1, further comprising, an electrically switching member which is attached to an outside of a wall of the hollow portion or the outlet portion and operated between "on" or "off" by a structure, which is coupled with the piston and movable together with movement of the piston, and which detects an occurrence of flow of fluid.

* * * * *